TRANSLATING APPARATUS
Filed April 6, 1960
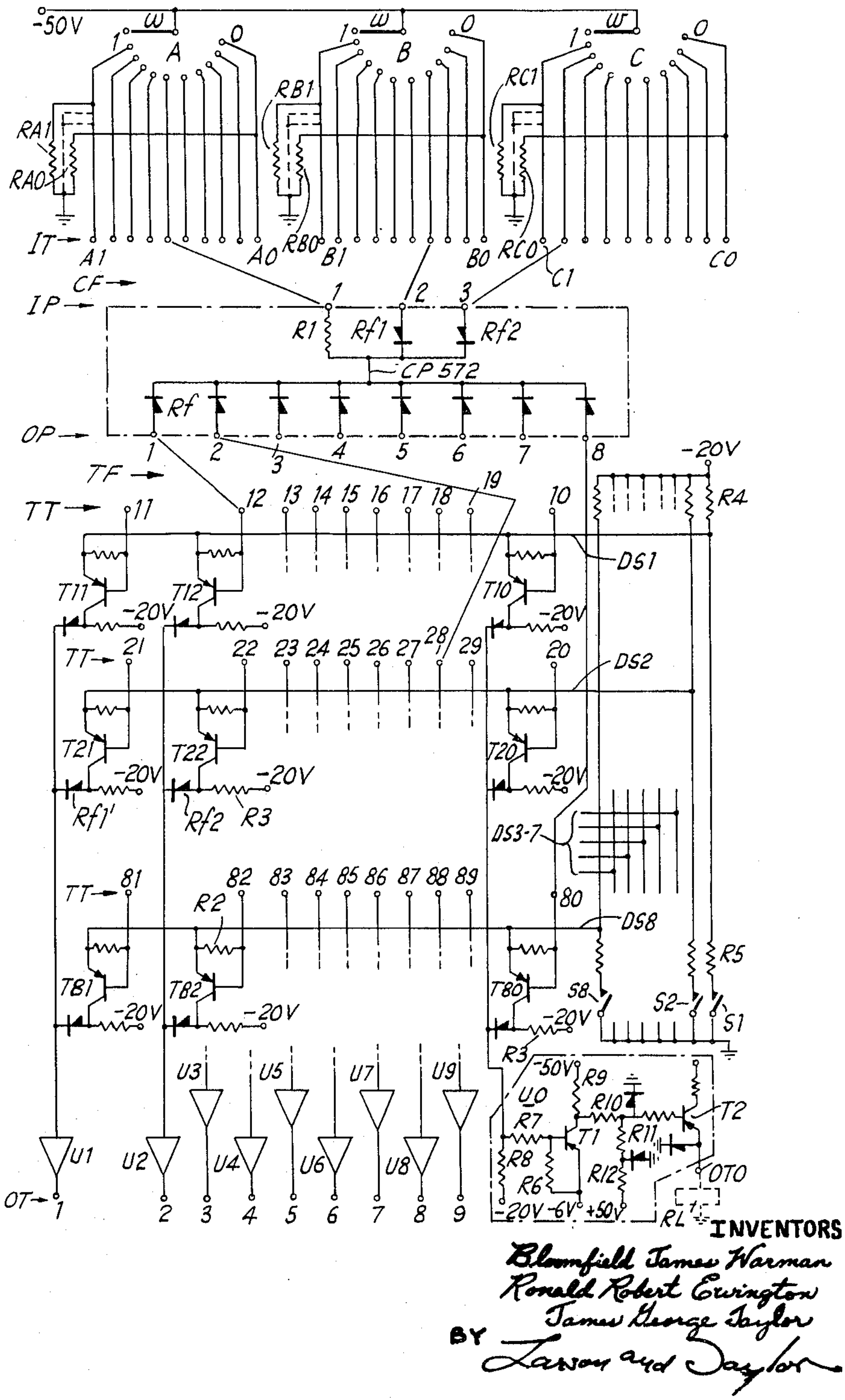
INVENTORS
Bloomfield James Warman
Ronald Robert Ewington
James George Taylor
BY Lawson and Taylor United States Patent Office 3,229,275
Patented Jan. 11, 1966

3,229,275
TRANSLATING APPARATUS

Bloomfield James Warman, Charlton, London, Ronald Robert Ewington, Seven Kings, Ilford, and James George Taylor, Eltham, London, England, assignors to Associated Electrical Industries Limited, London, England, a British company Filed Apr. 6, 1960, Ser. No. 20,426
Claims priority, application Great Britain, Apr. 15, 1959, 12,843/59
4 Claims. (Cl. 340—347)

This invention relates to translating apparatus such as is employed in automatic telephone and like systems and by which signals representing digital numbers, composed of what will be termed code digits together constituting a code, can be translated into other signals representing usually but not necessarily different digital numbers composed of what will be termed translation digits together constituting a translation.

In automatic telephone systems such translating apparatus is often employed for providing at an originating exchange, in response to a received code designating another exchange which serves a subscriber being called, a corresponding translation which relates to the routing of the call from the originating exchange to the other exchange. Where the translating apparatus is in an exchange in a large telephone area of, say, about five hundred exchanges, in which case each exchange is usually designated by a three-digit decimal code, provision may be required for a corresponding number of translations. For a national dialling telephone system, namely in which a number on an exchange in one area can be dialled directly by a subscriber on an exchange in another area without intervention of an operator, more than a thousand exchange designations and translations may have to be catered for and in such circumstances each exchange may be designated by a decimal code of from three to six digits. The number of digits in a translation, usually also decimal digits, depends on the routing requirements and may for example be six to eight.

The invention is particularly concerned with translating apparatus of a kind designed to function in conjunction with associated register equipment which stores the digits of a received code and in accordance with the values of the code digits marks, that is, applies a distinctive potential to, a unique combination of wires leading to a gating circuit by which the markings on these wires are combined into a single marking applied at the input side of the translating apparatus to a particular so-called code point individual to the particular code received, there being one such code point for each code for which the apparatus can provide a translation. In a known form of translating apparatus of this kind, a plurality of what will be called translation terminals, each pertaining to a particular value of a particular translation digit, is provided on the output side of a translation field over which the code points are cross-coupled with the translation terminals in such a way that the marking of a code point in response to a received code will result in the marking of a corresponding combination of translation terminals, one for each translation digit, in accordance with the values of the digits in the translation for the received code. These markings on the translation terminals can then be converted by suitable circuits into appropriate routing signals.

In certain circumstances the translation digits are required only one at a time, and it is an object of the invention to provide a translating apparatus which affords this facility in a relatively simple manner that can lead to economy both in the cost of the components of the apparatus and in the space occupied by them.

According to the invention, apparatus for translating digital codes into corresponding digital translations comprises a translation cross-connection field, a number of code points at the input side of the field, there being one code point for each different code to be catered for, a number of translation terminals at the output side of the field, each such terminal pertaining to a particular value of a particular translation digit, a number of digit selection leads each relating to a particular translation digit and being capable of being selectively marked according to a particular translation digit that is required, and a number of transistor coincidence gates, one per translation terminal, having respective first input connections respectively connected to the several translation terminals, respective second input connections of which those which belong to gates having their first input connections connected to translation terminals relating to different values of one and the same digit are coupled in common to the digit selection lead relating to that digit, and respective output connections of which those which belong to gates having their first input connections connected to translation terminals relating to one and the same value of the several translation digits are connected in common, preferably through a common amplifier to an output terminal of the apparatus, there being one such output terminal and, if provided, one such amplifier, for each different translation digit value.

The action of this translating apparatus according to the invention is that the marking appearing at a code point on receipt of a code requiring translation, is extended across the cross-translation field to mark those translation terminals which relate to the respective values of the several digits of the translation for that code. From these translation terminals the marking is extended to the gates whose first input connections are connected to them. Since the marked translation terminals relate to different translation digits, the gates to which the marking is thus extended also relate to the different translation digits and have their second input connections correspondingly connected to the relevant digit selection leads. Of these gates, therefore, the gate connected to the marked digit selection lead, and only this gate, passes an output marking towards the output terminal connected to the output of that gate, the value of the required translation digit being indicated by the particular output terminal thus marked. Subsequently, by marking another digit selection lead, the same or another output terminal will be marked in like manner according to the value of the newly selected translation digit.

By the employment of transistor coincidence gates in the manner and for the purpose set forth we achieve important economy of space and cost. By way of example a translating apparatus embodying the invention is illustrated by the accompanying drawing and will now be described. The single figure of the drawing shows a circuit diagram of the apparatus.

Referring to the drawing, the illustrated translating apparatus includes as the transistor coincidence gates already referred to a plurality of transistors T11 . . . T10, T21 . . . T20, . . . T81 . . . T80 each of which relates to a particular value of a particular translation digit. The first numeral of the designation of each transistor indicates the particular translation digit to which it relates (it being assumed that a translation can contain up to eight digits) while the second numeral indicates the particular digit value to which the transistor relates: thus transistor T12 relates to a value of two for the first translation digit, transistor T10 relates to a value of nought (or ten) for this first digit, and transistor T21 relates to a value of one for the second translation digit. These gate transistors can conveniently be considered as being arranged matrix-wise (whether or not they in fact have this physical arrangement) in a number of horizontal rows and vertical columns of which each row consists of the transistors relating to different values of one and the same digit and each column consists of the transistors which relate to the same value for the several digits: thus transistors T11, T12, . . . T10 in the top row relate to the values 1 . . . 0 respectively of the first translation digit, while the transistors T11, T21, . . . T81 in the left-hand column relate to a digit value of 1 for the eight translation digits respectively.

The translating apparatus, which for the purposes of illustration has been assumed to provide translations for three-digit codes only but which can easily be expanded to cater also for codes of six or any other number of digits, also includes:

- Thirty input terminals IT divided into three groups A(1 . . . 0), B(1 . . . 0), C(1 . . . 0) of which each group relates to a particular digit A, B or C of an incoming three-digit code and each terminal in a group relates to a particular value of the relevant code digit;
- A number of code points of which only one CP572 has been shown as typical but of which there is one for each different code for which a translation may be required;
- Eighty translation terminals TT each of which relates to a particular value of a particular translation digit, these translation terminals having been numbered according to the same scheme as used for the gate transistors and having for convenience been shown also as being arranged matrix-wise; and
- Eight digit selection leads DS1 . . . DS8 which can be marked one at a time to indicate which particular translation digit of a translation is required.

Individually associated with each code point such as CP572 is a coincidence-of-three resistance-rectifier combining gate constituted by a resistor R1 and two rectifiers R*f*1 and R*f*2 connected between the code point on the one hand and three gate input points such as IP(1 . . . 3) on the other hand. These input points IP of each code point gate are connected by way of a strapping field CF to the input terminals IT, one in each group, which correspond to the digit values of the digits constituting the code to which the code point relates. Thus for code point CP572, which as its designation implies corresponds to code 572, the gate input points IP(1 . . . 3) are respectively strapped to the fifth input terminal IT of the A group, the seventh input terminal of the B group and the second input terminal of the C group.

It may be noted here that in expanding the translator to give translations for, say, six-digit codes also, the number of input terminals IT would be increased to sixty in six groups of ten and each code point relating to a six-digit code would have associated with it a coincidence-of-six gate constituting by a resistor and five rectifiers connected between the code point and six input points IP appropriately cross-connected to the input terminals IT.

Each code point is connected through isolating rectifiers such as R*f* to eight output points OP(1 . . . 8) for its combining gate. These output points, each of which corresponds to a particular translation digit, are respectively connected over a translation strapping field TF to the eight translation terminals that relate to the particular values of these digits in the translation for the code concerned. To avoid confusion in illustrating this cross-connection field TF only the strappings for the first, second and eighth digits are shown, and on the assumption that in the translation for code 572 the values of the first two digits are 2 and 8 and that of the last digit is 0, points OP1, 2 and 8 are shown by way of example as being respectively connected to translation terminals TT12, 28 and 80.

Each of the gate transistors T1 . . . T80 has a first input connection from this base to the particular translation terminal (TT) which relates to the same digit and digit value as does the transistor, a second input connection from its emitter to the digit selection lead (DS) pertaining to the particular digit to which the transistor relates, and an output connection from its collector via an individual isolating rectifier such as R*f′* for transistor T21 to an output amplifier U1 . . . U0 which is common to the transistors in the same column and therefore relates to the same digit value as do the transistors in that column. Details of a suitable amplifier circuit are given for amplifier U0 and will be described later, the other amplifiers being represented only in block form. The output from each amplifier U1 . . . U0 appears at terminals OT(1 . . . 0) which constitute the output terminals for the translator. Each of the gate transistors preferably has its base connected to its emitter via a high resistor such as R2 for transistor T22, and the collector of each gate transistor is connected to a negative terminal of suitable supply potential via an individual collector resistor such as R3 for transistor T80.

The code input terminals IT are normally held at earth potential and can be selectively marked with a negative potential according to the digit values of a code received for translation. The marking of these terminals can be achieved in any desired manner but by way of example three digit switches A, B and C are shown each of which becomes set according to the values of the relevant A, B or C digit of an incoming code. The contact arc of each of these digit switches has a home contact M and at least ten other contacts 1 . . . 0 to which the terminals IT are respectively connected to which the wiper *w* of the switch is set according to the digit value. Each terminal IT and the digit switch arc contact to which it is connected are normally held at earth potential over an individual resistor such as RA1 . . . RA0, RB1 . . . RB0, RC1 . . . RC0 but are marked by a negative potential applied over the switch wiper *w* when set to the arc contact concerned. The negative marking potentials which will thus appear on one of the terminals IT from each of the three groups according to the particular code received, are extended across the strapping field CF to the combining gate of the relevant code point, which thereupon becomes exclusively marked with a negative potential by the combining action of its gate. Thus if the received code is 572, code point CP572 will become negatively marked in this way.

The negative marking potential at the code point is extended across the translation strapping field CF and marks the relevant translation terminals according to the digit values of the several digits of the required translation, including, for code 572, the translation terminals TT12, 28 and 80.

The digit selection leads DS1 . . . DS8 are normally held at a negative potential over individual resistors such as R4 for lead DS1. In general this potential has a value not more positive than and preferably approximating to the quiescent potential of the collectors of the gate transistors such as T11. To select the digit to which a particular selection lead relates, this lead is marked, by operation of the relevant one of eight switches S1 . . . S8, with a potential which is relatively positive to the quiescent collector potential of the gate transistors this marking potential either being earth potential, in which case the switches S1 . . . S8 can apply earth potential directly to the digit selection leads, or being preferably somewhat greater than earth, in which case, as in the arrangement shown in the drawing, a further resistor such as R5 for lead DS1 can be included between the switch and the digit selection lead to form a potential divider with the resistor such as R4. The switches S1 . . . S8 may be constituted for instance by relay contacts or by electronic switching devices.

Let it be assumed that the eighth digit of the translation for code 572 is required. Terminals TT12, 28 and 80 are marked with a negative potential as already described and switch S8 is closed to mark the digit selection lead DS8 also with a (negative) potential which is however positive with respect to the collector potential of the gate transistors. The transistors are assumed to be of a p-n-p type and will conduct in response to a negative base potential provided, however, that the emitter potential is sufficiently positive with respect to the collector potential. Accordingly in the row pertaining to the required translation digit (that is the row of transistors T81, T82 . . .) the transistors are primed for conduction by the relatively positive marking applied to the emitters from the marked digit selection lead DS8, but of these transistors only transistor T80 has its base marked with the negative marking potential extended over the translation strapping field TF. Consequently transistor T80 conducts and its collector goes positive towards the marking potential of lead DS8 because of the voltage drop in its collector resistor R3, this positive-going collector potential being applied to amplifier U0 which in consequence marks the output terminal OT0 to indicate that the value of the selected translation digit is ought (or ten). The other transistors in the row T81, T82 . . . are primed from the marked digit selection lead DS8, but do not conduct because their bases are not marked with a negative potential from the translation strapping field TF. The transistors in the other rows, un-primed because of the unmarked condition of the relevant DS lead, also do not conduct even although as in the case of transistors T12 and T28 their bases may be marked from the translation field TF.

The circuit illustrated for amplifier U0 comprises two stages including transistors T1 and T2 respectively. Transistor T1 is normally conductive by reason of a forward bias applied between its emitter and base by the voltage drop across resistor R6 in a potential dividing resistor chain R6, R7, R8. With the potential at the collector of transistor T1, therefore, relatively low because of the voltage drop across its collector resistor R9, further resistors R10, R11, R12 are dimensioned to apply to the base of transistor T2 by a potential dividing action a potential which is somewhat positive to the emitter potential of this transistor, thereby holding it cut-off. On conduction of the transistor T80 (or of any other transistor in the same column) the consequent positive-going potential applied to amplifier U0 cuts transistor T1 off and its resulting negative-going potential bottoms transistor T2. The transistor output terminal OT0 may be connected either to the collector or to the emitter of transistor T2 according to the requirements of a circuit which receives and utilises the translation. By way of example the terminal OT0 has been shown connected to the emitter of transistor T2 with a relay RL indicated as being connected to it as part of a utilisation circuit, this relay being operated in response to conduction of transistor T2.

What we claim is:

1. Apparatus for translating digital codes into corresponding digital translations, comprising a number of code points including one such code point for each different code for which translation may be required, connections for exclusively marking the relevant code point on presentation of a code for translation, a number of translation terminals including separately for each translation digit a group of such translation terminals selectively markable to represent a particular value for such digit, a translation cross-connection field between said code points on its input side and said translation terminals on its output side, a number of digit selection leads each relating to a particular translation digit and selectively markable according to a particular translation digit required, and a number of transistor coincidence gates, one per translation terminal, having respective first input connections respectively connected each to a different one of the several translation terminals, respective second input connections of which those which belong to gates having their first input connections connected to translation terminals in one and the same group thereof pertaining to a particular translation digit are coupled in common to the digit selection lead relating to that digit, and respective output connections of which those which belong to gates having their first input connections connected to translation terminals which correspond to each other in the several groups thereof are connected in common to an output terminal of the apparatus, said output terminal being one of a number thereof corresponding to the greatest number of translation terminals in a group.

2. Translating apparatus as claimed in claim 1 including a common amplifier in the common connection to each output terminal from the relevant gates.

3. Translating apparatus as claimed in claim 1, wherein each said transistor coincidence gate comprises a transistor having base, emitter and collector electrodes of which the base electrode has one of said input connections connected to it, one of the other electrodes has the other of said input connections connected to it, and the remaining electrode has said output connection connected to it, the transistor being connected for non-conduction in the quiescent state of the apparatus and for conduction to mark the output connection in response to coincident presence of markings on the input connections.

4. Translating apparatus as claimed in claim 1, wherein each said transistor coincidence gate, relating to a particular translation digit according to the translation terminal group to which its first input connection is connected, comprises a transistor having base, emitter and collector electrodes of which the base electrode is connected to the relevant translation terminal in said group, the emitter electrode is connected to the digit selection lead pertaining to the relevant digit, and the collector electrode is connected via isolating means to the pertinent output terminal according to the particular terminal in said group to which the base electrode is connected, the transistor being connected for non-conduction in the quiescent state and for conduction to mark the output terminal in response to coincident presence of markings at said translation terminal and on said digit selection lead.

References Cited by the Examiner

UNITED STATES PATENTS

| | | | |
|---|---|---|---|
| 2,743,316 | 4/1956 | Mallery | 179—18 |
| 2,745,958 | 5/1956 | Depp | 179—18 |
| 2,876,285 | 3/1959 | Bjornson et al. | 340—166 XR |
| 2,876,289 | 3/1959 | Faulkner | 179—18 |
| 2,907,525 | 10/1959 | Hobbs | 340—347 X |
| 2,909,768 | 10/1959 | Kautz | 340—347 |
| 3,025,697 | 1/1962 | Klinkhamer | 340—166 XR |
| 3,111,659 | 11/1963 | Warman | 320—347 |

MALCOLM A. MORRISON, *Primary Examiner.*

EVERETT R. REYNOLDS, *Examiner.*